Oct. 29, 1963 H. G. MUENCHINGER 3,108,623
TOOLS FOR RECESSED HEAD FASTENERS
Original Filed May 5, 1959 5 Sheets-Sheet 1

INVENTOR
HERMAN G. MUENCHINGER

BY Watson, Cole, Grindle & Watson
ATTORNEYS

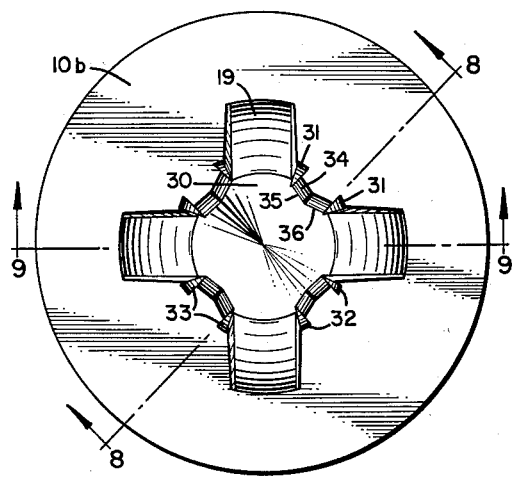
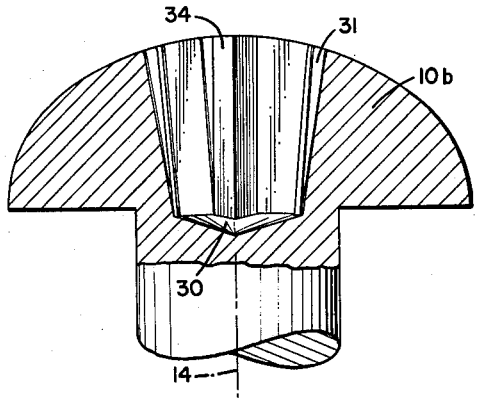
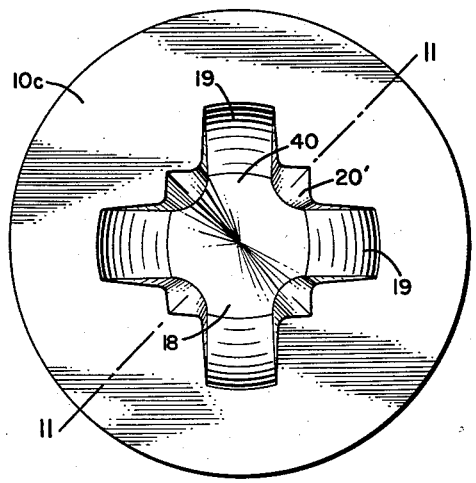
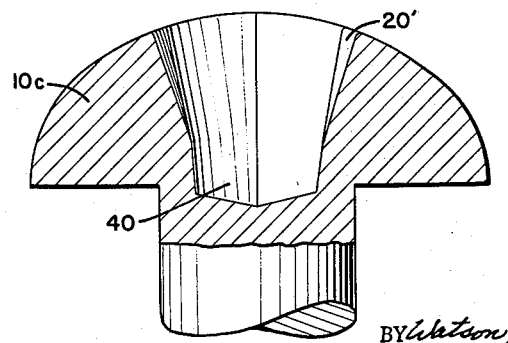

Oct. 29, 1963    H. G. MUENCHINGER    3,108,623
TOOLS FOR RECESSED HEAD FASTENERS
Original Filed May 5, 1959                5 Sheets-Sheet 3
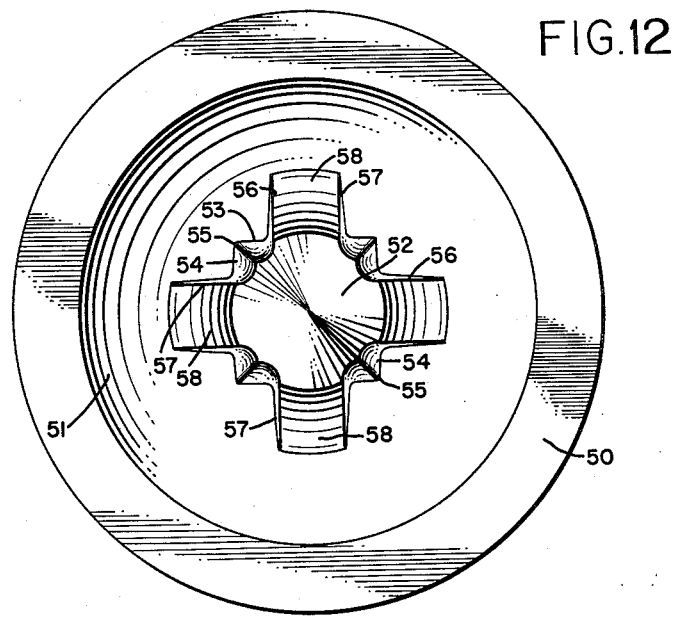
FIG.12
FIG.13
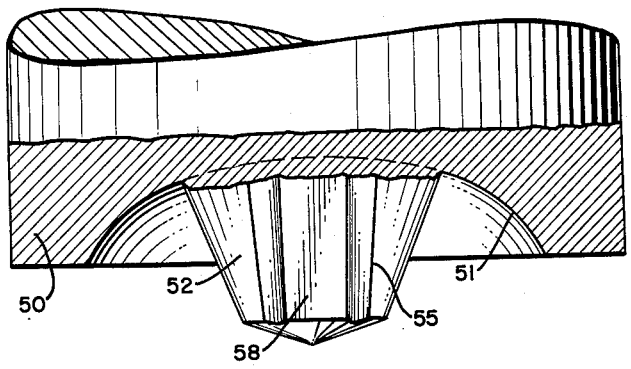
FIG.14
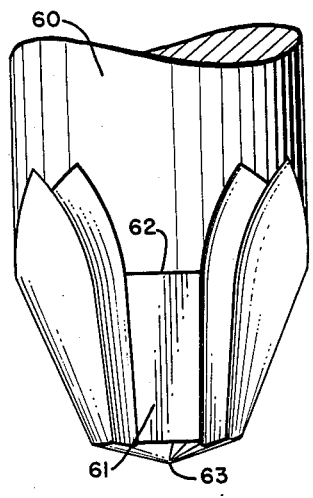
FIG.15
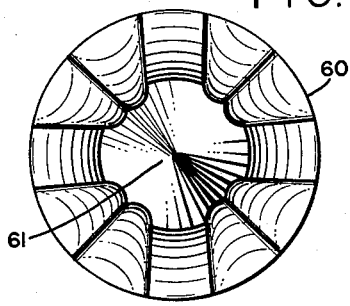
INVENTOR
HERMAN G. MUENCHINGER
BY Watson, Cole, Grindle & Watson
ATTORNEYS Oct. 29, 1963  H. G. MUENCHINGER  3,108,623
TOOLS FOR RECESSED HEAD FASTENERS
Original Filed May 5, 1959  5 Sheets-Sheet 4

INVENTOR
HERMAN G. MUENCHINGER

BY Watson, Cole, Grindle & Watson
ATTORNEYS

Oct. 29, 1963  H. G. MUENCHINGER  3,108,623
TOOLS FOR RECESSED HEAD FASTENERS
Original Filed May 5, 1959  5 Sheets-Sheet 5

INVENTOR
HERMAN G. MUENCHINGER

BY Watson, Cole, Grindle & Watson
ATTORNEYS

United States Patent Office 3,108,623
Patented Oct. 29, 1963

3,108,623
TOOLS FOR RECESSED HEAD FASTENERS
Herman G. Muenchinger, Chaplin, Conn., assignor, by mesne assignments, to Phillips Screw Company, East Boston, Mass., a corporation of Delaware
Original application May 5, 1959, Ser. No. 811,105. Divided and this application Nov. 30, 1959, Ser. No. 856,133
5 Claims. (Cl. 145—50)

This invention relates to tools for threaded fasteners, and is a division of my co-pending application Serial No. 811,105, filed May 5, 1959.

Threaded fasteners having tool-engaging recesses of the "Phillips" type described and claimed in United States Patent No. 2,046,839 have been widely and successfully used throughout the world. The particular recess disclosed in the said patent has more recently been improved by reducing the taper of the recess, as disclosed in United States Patent No. 2,474,994, thus reducing the tendency of the screw driver to be thrust axially out of the recess upon the application of high torque, and increasing the value of torque which may be applied before throw-out occurs.

A widespread use of the so-called "Phillips" recess occurs in connection with self-tapping threaded fasteners, i.e., fasteners adapted for use in connection with metals, plastics, and other materials in which previously drilled holes may be threaded or tapped in the process of driving, into such holes, fasteners provided with so-called tapping threads or teeth. The successful application of self-tapping fasteners requires that the fasteners possess certain essential recess characteristics including the following:

(1) High driving torque capacity.
(2) Easy entry of the driving tool.
(3) Maximum stability of the driving tool in the fastener recess.

Moreover, in order to be commercially successful, fasteners provided with recesses having the foregoing characteristics must be capable of manufacture by the conventional two-blow heading technique. This involves striking the end of the wire or other material of which the fastener is made, while the same is supported in the die of the heading machine, first with a tool which forms a bloom on the end of the blank and then with a further tool which finishes the head and forms the driver-engaging recess therein. This operation is carried out automatically and at high speed.

It is well known, through experience gained in the manufacture of many millions of recessed head fasteners, that accurate conformance of the material of the fastener blank with the recess-forming punch cannot be achieved without the application of positive inwardly directed radial pressure, as is inherently involved in the production of fasteners having counter-sink heads, socket heads, and the like. In punching recesses in other types of fastener heads, known generally as protruding heads, a phenomenon known as metal fall-away is always encountered. Protruding head fasteners made by the two-blow cold heading method represent by far the largest usage of fasteners in self-tapping applications. Such protruding head fasteners may be of the types known as round, pan, truss, or binding head screws, for example, having heads of which the bottom lies in a plane at right angles to the fastener axis. In producing recessed heads of this type, naturally, the application of positive inwardly directed radial pressure is not possible. On the other hand, as mentioned above, self-tapping applications require the highest driving torques and maximum driver stability which characteristics, naturally, are interrelated. In other words, the driving tool must be capable of delivering high torque without wobbling in the recess. Heretofore, this combination of characteristics has been virtually impossible of achievement because increased torque capacity required a recess having driving walls approaching parallelism with the fastener axis. However, parallel or nearly parallel driving walls eliminate the possibility of a surface wedge fit between the driving tool and the fastener, which is required for driver stability. The problem is further complicated by the phenomenon of metal fall-away in the heading operation, as previously mentioned.

The extent of metal fall-away in the production of protruding head fasteners varies according to the hardness or type of material being headed, the proportions (i.e. the ratio of the over-all diameter of the recess to the diameter of the central portion or throat of the recess), and depth of the recess. It has been found that for a certain recess design this condition, which does not necessarily follow a linear formula, approaches a critical point beyond which there is little appreciable change. The fall-away produces a curved condition starting at a point approximately one-half to two-thirds of the way from the bottom of the recess; that is, a fairly good adherence of the metal to the punch is observed in the lower portions of the recess. Contrary to first impression, this condition has an over-all detrimental effect on driver stability. A good driver fit at the bottom portion of the recess merely provides a pivot point about which the driver wobbles because of excessive clearance around the upper surfaces of the recess.

Moreover, during the course of the heading operation, wear of the heading punch invariably occurs near its point, resulting in a reduction in recess size in the lower region, with correspondingly less driver penetration. This condition simply aggravates the problem of driver wobble in the recess. This wobble is particularly troublesome in starting the screw into the work-piece, because unless there is good stability between screw and driver, the axial thrust of attempting to start the screw into the work merely causes the screw to "bend off" the driver. Instability of the screw and driver fit, therefore, greatly hampers assembly line operations for this reason, as well as because of diminished torque capacity.

Metal fall-away in the punching of recessed fastener heads assumes two aspects, i.e. "plowing" and "pull-away." The first results from the outward impetus given to the material of the fastener head by the impact of the penetrating punch. Pull-away, on the other hand, depends upon the ratio between the maximum and minimum radii of the recess and the greater this ratio, the greater the pull-away. That is to say, in producing a recess in which the radial extent of the grooves is several times the radius of the central recess portion, the metal of the sectors between the grooves will be pulled outward to a considerably greater extent than in the case of a recess in which the radial extent of the grooves is only moderately greater than the radius of the central recess portion. This is due to an effect which may be roughly likened to the effect of the surface tension in a liquid.

Careful investigation has indicated that the chordal angle of fall-away curvature approaches 10° to 15° from the screw axis. This fall-away cannot, however, be offset by increasing the vertical angles of the recess and the corresponding punch, because to do so would increase the above-mentioned cam-out or throw-out component, which in turn limits the torque capacity of the fastener-driver combination.

The invention described and claimed in the aforesaid co-pending application solves, to a considerable degree, the problems resulting from the aforesaid fall-away phenomenon by providing a recess in which the ratio of the radial extent of the grooves to the central recess portion is reduced by providing, between each pair of adjacent grooves, one or more valleys or serrations in place of the conventional angular or curved rib or ridge. In addition to improving the above-mentioned ratio, and thus alleviating the metal pull-away during the punching operation, the provision of the aforesaid valleys or serrations accomplishes an improvement in torque capacity by providing additional areas of driving contact between the fastener recess and a corresponding driving tool.

Accordingly, it is an object of the present invention to provide tools for punching and for driving a threaded fastener having a tool-engaging recess extending into its upper end along its longitudinal axis and comprising a central portion and grooves radiating therefrom, the wall of said central portion between each pair of adjacent grooves being formed to provide one or more valleys extending from the upper end of the fastener toward the bottom of the recess, said valley or valleys being laterally bounded by generally axially extending tool-engaging surfaces. Some or all of the added tool-engaging surfaces may incline inwardly, that is to say taper downwardly toward the fastener axis. Preferably, the above-mentioned valleys are substantially triangular in horizontal section and of downwardly diminishing sectional area.

A further object of the invention is the provision of tools for use in connection with a recessed head fastener of the type defined in the preceding paragraph, in which the tool-engaging surfaces of each aforesaid valley mutually intersect in a line which is inclined downwardly toward the fastener axis at an angle greater than about 10°, and optimally about 14°. Such tool-engaging surfaces need not, however, intersect to form a sharp dihedral angle. If a plurality of valleys are provided between the grooves of each adjacent pair, they may be closely adjacent or may be separated by an intervening rib of curved or angular transverse section.

Preferably, the aforesaid valleys will extend from the top of the fastener head to the bottom of the recess, i.e. to the plane of junction between the grooves and the central recess portion. However, if desired, the valleys may diminish to zero at a point above said plane.

More specifically, it is an object of the invention to provide tools complementary to the above described recesses, which tools may be either punches for forming the recesses in headed fastener blanks, or may be driving tools for cooperating with the recesses in the application of fasteners to the work. The punches and drivers of the present invention may, of course, vary in the same respects pointed out above in connection with the recess.

Other and further objects, features and advantages will be apparent from the description which follows, read in connection with the accompanying drawings in which FIGURES 1 and 2 are illustrative of the prior art, showing in plan and axial section, respectively, a recessed head fastener with the tip of a driving tool inserted in the recess thereof;

FIGURE 3 is a plan view of a fastener head provided with a recess according to the co-pending application, and with the tip of a driving tool of the present invention inserted therein;

FIGURES 4, 5 and 6 are fragmentary sectional views taken on lines 4—4, 5—5 and 6—6 of FIGURE 3;

FIGURE 7 is a plan view of a modified recess according to the co-pending application;

FIGURES 8 and 9 are fragmentary axial sections on lines 8—8 and 9—9, respectively, of FIGURE 7;

FIGURE 10 is a plan view of a further modification of the fastener recess;

FIGURE 11 is a fragmentary axial section on line 11—11 of FIGURE 10;

FIGURE 12 is a bottom plan view of a punch according to the present invention, for punching the recess of FIGURE 3;

FIGURE 13 is a side elevation, partly broken away, of the punch of FIGURE 12;

FIGURE 14 is an elevational view of the tip of a driving tool corresponding to the recess of FIGURE 3;

FIGURE 15 is an end view of the tool of FIGURE 14;

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Figure 1:
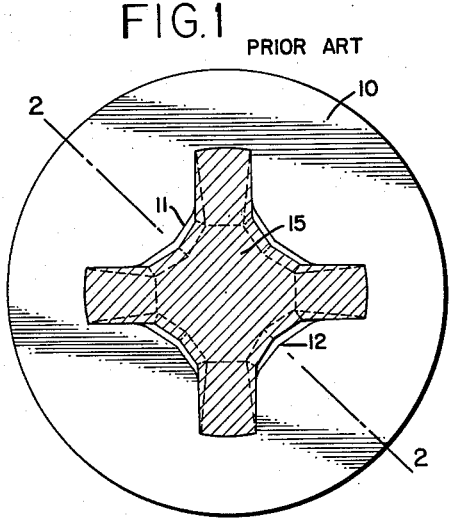
Figure 2:
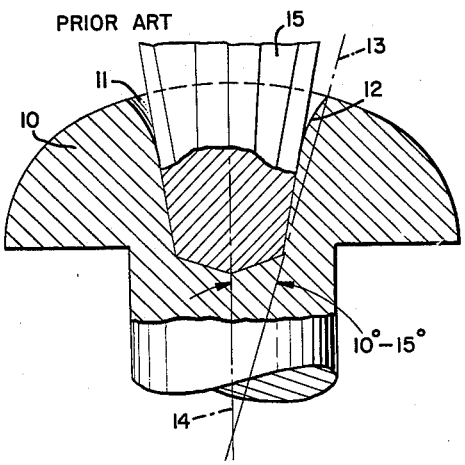

Referring to FIGURES 1 and 2, the fastener head 10 is provided with a recess 11 produced by cold heading in the usual manner, the recess being typical of those resulting in the commercial production of recessed head fasteners of the type disclosed in United States Patent No. 2,474,994. As will be seen in FIGURE 2, the metal of the head has fallen away, in the punching operation, as indicated at 12 to such an extent that the chord 13 of the corresponding curve makes an angle of 10° to 15° with the fastener axis 14. For clarity of illustration, this angle has been somewhat exaggerated in FIGURE 2. The metal fall-away phenomenon occurs in the recess forming operation, qualitatively though not necessarily quantitatively in the manner illustrated. In the usual case, the noticeable fall-away begins at a point approximately one-half to two-thirds of the recess depth, measured from the bottom of the recess. The result is a poor fit of the driving tool 15 in the recess, allowing the latter to wobble very noticeably, particularly when the necessary end thrust is applied in order to keep the driver seated in the recess during starting of the screw in the workpiece. In addition the wobble diminishes the torque capacity of the driver-fastener combination illustrated. As is clear from consideration of FIGURES 1 and 2, this torque capacity is further greatly affected by the diminution of the area of driving contact between the driving tool and the fastener recess.

Figure 3:
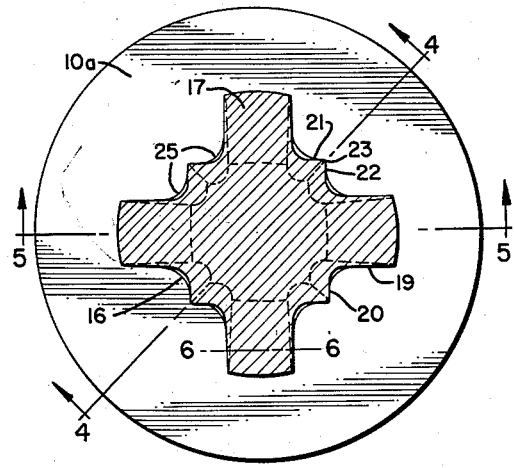
Figure 4:
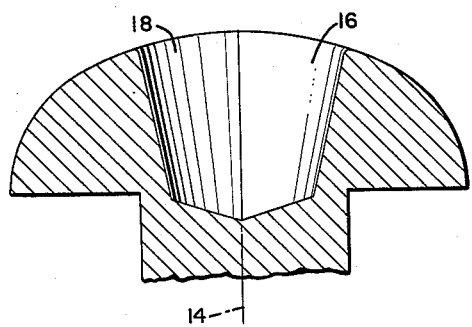
Figure 5:
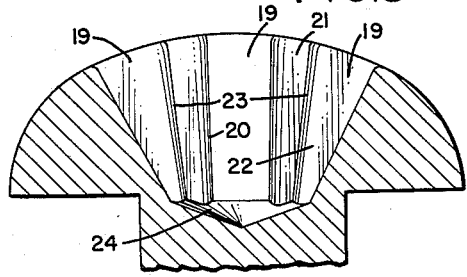
Figure 6:
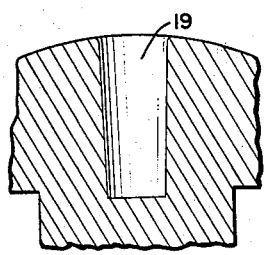

FIGURES 3 to 6 illustrate a fastener head provided with a recess 16 made according to the invention of my copending application, FIGURE 3 also showing the tip of a driving tool 17 in transverse section. The recess extends into the upper end of the fastener head 10a along the longitudinal axis 14 of the fastener and comprises a central recess portion 18, best seen in FIGURE 4 and four generally radial grooves 19 extending outwardly from the central portion 18. A radial groove 19 is seen in vertical section in FIGURE 6.

Between each adjacent pair of grooves 19 the wall of the central portion 18 is formed to provide a valley 20 bound by lateral surfaces 21 and 22 which intersect in a line 23. Each valley 20 extends downwardly from the upper surface of the head 10a to the plane at which the grooves 19 intersect the recess central portion 18. The central portion 18 preferably terminates downwardly in a generally conical depression 24.

Each of the lateral surfaces 21 and 22 of each valley 20 is inclined downwardly toward the axis of the fastener at such an angle that their line 23 of intersection lies at an inclination of between about 10° and 15° to the fastener axis. This line of intersection, which represents the bottom of the valley in question, may thus be made to incline at approximately the same angle as the natural angle of fall-away of the material of which the fastener is being fabricated and in this manner fall-away in the vicinity of the valley bottoms is completely or substantially compensated. Accordingly, a correspondingly shaped driving tool will mate substantially exactly with such a recess, at least in the vicinity of the several valley bottoms, all the way from the top to the bottom of the recess, thus promoting great stability of the tool in the recess. Moreover, due to the decrease in the ratio of the greatest radius of the recess to the smallest radius thereof (in any plane normal to the fastener axis) the pull-away effect of the punching operation is considerably reduced with the result that the only noticeable fall-away of metal occurs along the ridges or ribs 25 separating the valleys 20 from the grooves 19. The fall-away in these areas is of relatively slight extent, leaving substantial areas of the lateral surfaces 21 and 22 to mate exactly with the corresponding surfaces of a driving tool, thus considerably increasing the driving contact area between tool and fastener. The over-all result of this improvement in the design of fastener recess and corresponding driving tool is to improve greatly the stability of the driver-fastener combination, as well as to increase substantially the torque capacity of the couple, in both driving and fastener-removal directions. A comparison between FIGURES 1, 2 and 3, 4 readily illustrates such over-all result. Thus, the driving contact between the walls of each valley 23 (FIG. 3) and the corresponding driver extends throughout the full depth of the recess, as contrasted with the situation depicted in FIGURES 1 and 2, in which there is no contact between the driver and the central recess walls over the upper one-third of the recess.

Referring now to FIGURES 7, 8 and 9 the fastener head 10b is provided with a recess 30 which differs from the recess 16 of FIGURES 3–6 in that two valleys 31 are provided between the grooves 19 of each adjacent pair. Each valley 31 is bounded by lateral surfaces 32 and 33, the surfaces 33 lying in planes substantially parallel to the fastener axis 14 while the surfaces 32 lie in planes which slope inwardly and downwardly toward the axis 14. The valleys 31, in the illustrated embodiment, are separated by a rib 34 bounded by two intersecting plane surfaces 35 and 36, the rib 34 corresponding generally to the ribs between the grooves of the recess disclosed in United States Patent No. 2,474,994, mentioned above. If desired, however, the ribs 34 may be diminished in width by increasing the size of the valleys 31, or may be eliminated completely by introducing further valleys between the valleys 31. In either case, the benefits described in connection with the embodiment of FIGURES 3–6, will be at least partly realized, since the effect of metal fall-away will be substantially fully compensated in the viscosity of the bottoms of the valleys, and the total driving contact area of the recess will be increased.

FIGURES 10 and 11 illustrate a further modification in which the fastener head 10c is provided with a recess 40 which differs from that illustrated in FIGURES 3–6 in that the valley 20′ between each pair of adjacent grooves 19 diminishes in depth and cross-sectional area to a zero value at a point above the plane at which the grooves 19 merge with the central recess portion 18. The bottom of the valleys 20′ incline to the fastener axis 14 at an angle of between 10° and 15°, as before, while the angle of inclination of the lower wall portions of the central recess is at the conventional value of about 5°–7°. The modifications illustrated in FIGURES 7 and 10, respectivey, may of course be combined in a single recess if desired.

FIGURES 12 and 13 illustrate a recess forming punch designed to produce recessed fastener heads corresponding to FIGURES 3–6. The punch comprises a body 50 of suitably hardened metal provided with a concavity 51 corresponding to the desired convex shape of the upper fastener head surface. In the present instance the concavity 51 is substantially parti-spherical. The nib 52 of the punch is integral with the body 50 and concentric therewith and with the concavity 51. The nib 52 corresponds precisely with the recess illustrated in FIGURES 3–6 and described in connection therewith, except for the recess surfaces 25 in which a slight metal fall-away has taken place, in forming the recess. That is, the lateral surfaces 53 and 54 of each ridge 55 merge with the adjacent walls 56 and 57 of wings 58 in a curve of quite small radius, so that the surfaces 53 and 54 will be substantially entirely planar.

The driving tool illustrated in FIGURES 14 and 15 comprises a shank or rod 60, shown as cylindrical in the present case, and a shaped nib 61 which, from the transverse plane indicated at 62 to the extremity 63 is precisely like the nib 52 of the punch illustrated in FIGURES 12 and 13. Such a driving tool, of course, will make substantially complete mating contact with the recess illustrated in FIGURES 3–6. Moreover, a comparison of FIGURES 1 and 3 shows that the driver of the present invention has a considerably larger section than that of the conventional driver, thus decreasing driver breakage and increasing the torque capacity of the driver. Also, the improved stability of the driver in the recess enables both to be made with driving surfaces which are more nearly parallel to the screw axis than has heretofore been practical, which results in a further increase in torque capacity of the couple. As mentioned above, this is especially important in self-tapping applications.

Figure 16:
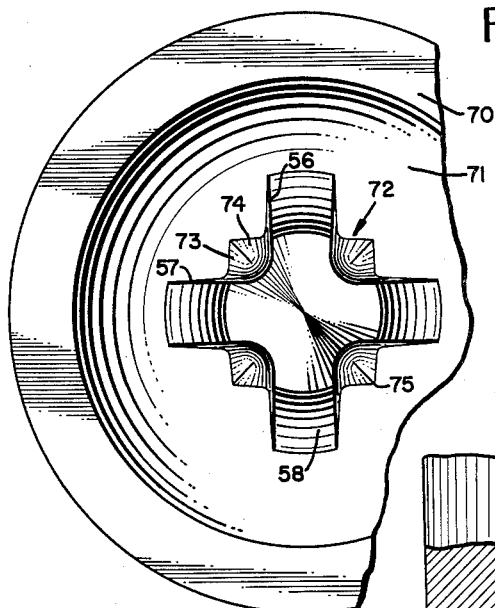
FIGURE 16 is a view similar to FIGURE 12 but illustrating a punch suitable for forming the recess of FIGURE 10.
Figure 17:
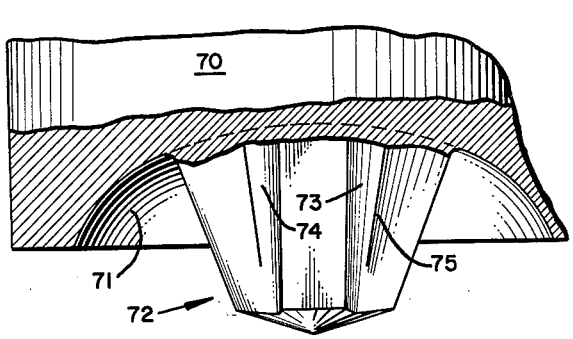
FIGURE 17 is a view similar to FIGURE 13, but illustrating the punch of FIGURE 16.
Figure 18:
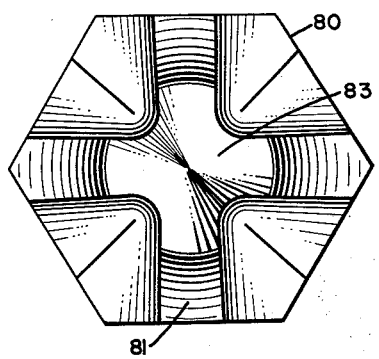
FIGURES 18 and 19 illustrate, in end view and fragmentary side elevation, respectively, the tip of a driving tool corresponding to the recess of FIGURE 10.
Figure 19:
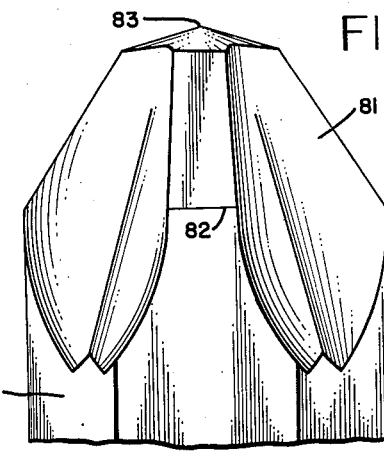

The punch illustrated in FIGURES 16 and 17 comprises a body 70 provided with a concavity 71 and a nib 72 shaped to produce the recess illustrated in FIGURES 10 and 11 and differing from that recess only in the same respect as the punch of FIGURE 12 differs from the recess of FIGURE 3, namely, in that the recess exhibits a slight fall-away of metal from those areas of the punch in which the lateral surfaces 73 and 74 of ribs 75 merge with the adjacent walls 56 and 57 of wings 58. The driving tool illustrated in FIGURES 18 and 19 comprises a rod or shank 80 of optional hexagonal form, as illustrated, having a nib 81 shaped, from the plane 82 to the extremity 83, in exact conformity with the nib 72 of the punch seen in FIGURE 16. Such a tool makes substantially complete driving area contact with the recess of FIGURE 10.

Figure 20:
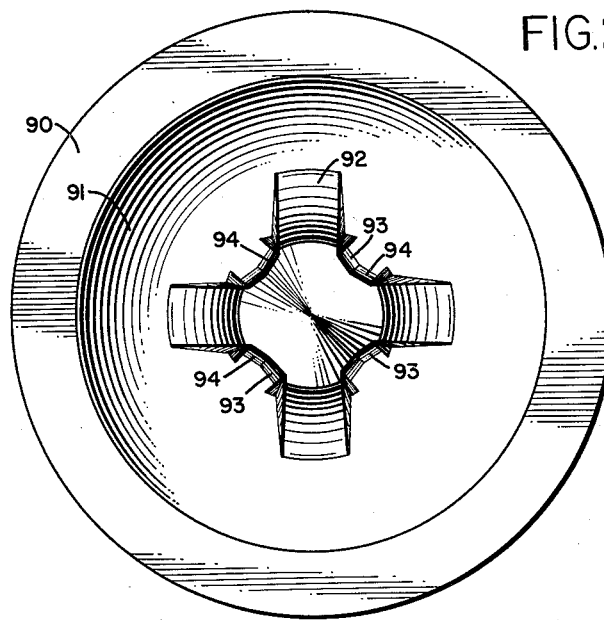
FIGURE 20 is a view similar to FIGURE 12, but illustrating a punch corresponding to the recess of FIGURE 7.
Figure 21:
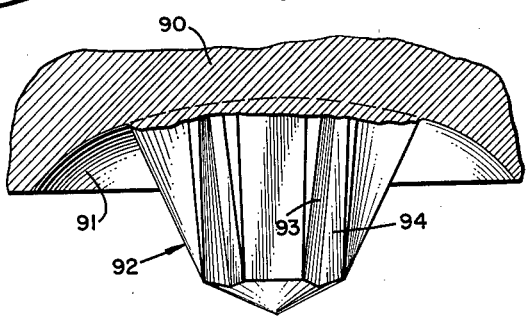
FIGURE 21 is a view similar to FIGURE 13, but illustrating the punch of FIGURE 20.

The punch illustrated in FIGURES 20 and 21 comprises a body 90 having a concavity 91 and an integral nib 92 which is substantially the exact counterpart of the recess illustrated in FIGURE 7 and described in connection therewith, the only significant difference being due to the slight metal fall-away which may occur along the upper portions of the surfaces 35 and 36 of FIGURE 7, which otherwise correspond to the surfaces 93 and 94 of FIGURE 20.

Figure 22:
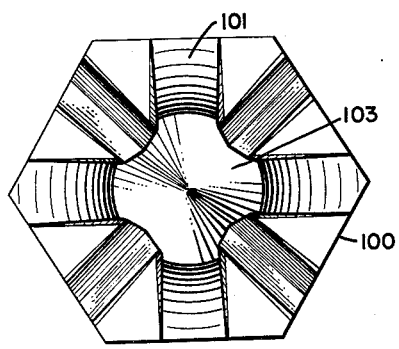
FIGURES 22 and 23 illustrate in end view and fragmentary side elevation, respectively, the tip of a driving tool corresponding to the recess of FIGURE 7.
Figure 23:
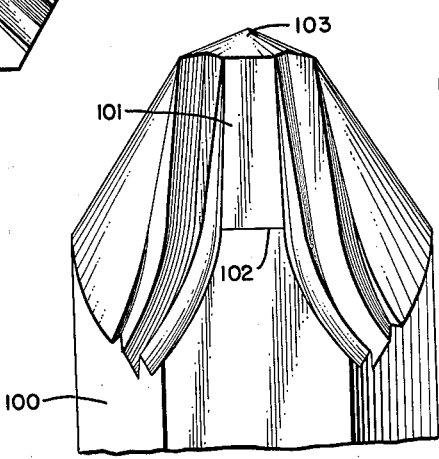

The tool illustrated in FIGURES 22 and 23 is, in this instance also, shown as comprising a hexagonal rod or shank portion 100 provided with an integral shaped nib 101. It will be understood that in the case of driving tools, the shank portion may be either cylindrical, hexagonal or any suitable transverse section. The nib 101 of the present tool, from the transverse plane indicated at 102 to the extremity 103, is the exact counterpart of the nib 92 of the punch seen in FIGURES 20 and 21. Such a tool, of course, mates substantially exactly with the recess illustrated in FIGURES 7–9.

Having thus described the invention, what is claimed as new and desired to be secured by Letters Patent is:

1. A tool for recessed-head fasteners, said tool having a body portion and a terminal nib portion formed at one end of said body portion, said nib portion comprising a central core and four equiangularly spaced wings radiating therefrom, the wall of said core between adjacent wings being formed to provide a ridge extending from said body portion toward the terminal extremity of said nib portion, said ridge being of substantially triangular transverse section and of diminishing sectional area toward said extremity, said ridge being bounded by small radius, arcuate fillets merging with the sidewalls of said wings.

2. A tool as defined in claim 1, said ridge being defined by longitudinally straight surfaces tapering inwardly toward said extremity.

3. A tool as defined in claim 1, the sectional area of said ridge diminishing to zero at a point short of said extremity.

4. A tool as defined in claim 1, said ridge being defined by substantially planar surfaces intersecting in a line inclined inwardly toward said extremity at an angle of between 10 to 14 degrees with respect to the axis of said tool.

5. A tool as defined in claim 1, said ridge being defined by substantially planar surfaces intersecting in a line inclined inwardly toward said extremity.

References Cited in the file of this patent
UNITED STATES PATENTS

| | | |
|---|---|---|
| 1,908,081 | Thompson | May 9, 1933 |
| 2,046,837 | Phillips | July 7, 1936 |
| 2,173,707 | Brown | Sept. 19, 1939 |
| 2,268,515 | Olsen | Dec. 30, 1941 |
| 2,285,462 | Purtell | June 9, 1942 |
| 2,369,852 | Purtell | Feb. 20, 1945 |
| 2,395,476 | Givnan | Feb. 26, 1946 |
| 2,507,231 | Tomalis | May 9, 1950 |
| 2,601,453 | Phippard | June 24, 1952 |
| 2,673,359 | Stellin | Mar. 30, 1954 |